(12) United States Patent
Fujiwara

(10) Patent No.: US 11,149,140 B2
(45) Date of Patent: Oct. 19, 2021

(54) VINYL CHLORIDE RESIN COMPOSITION, VINYL CHLORIDE RESIN MOLDED PRODUCT, AND LAMINATE

(71) Applicant: ZEON CORPORATION, Tokyo (JP)

(72) Inventor: Takanori Fujiwara, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/495,211

(22) PCT Filed: Mar. 13, 2018

(86) PCT No.: PCT/JP2018/009765
§ 371 (c)(1),
(2) Date: Sep. 18, 2019

(87) PCT Pub. No.: WO2018/173858
PCT Pub. Date: Sep. 27, 2018

(65) Prior Publication Data
US 2020/0010659 A1  Jan. 9, 2020

(30) Foreign Application Priority Data

Mar. 21, 2017  (JP) .............................. JP2017-054800

(51) Int. Cl.
| C08L 27/06 | (2006.01) |
| C08K 5/00 | (2006.01) |
| C08K 5/12 | (2006.01) |
| C08K 3/22 | (2006.01) |
| B29C 41/18 | (2006.01) |
| B32B 27/30 | (2006.01) |
| B32B 27/40 | (2006.01) |
| B32B 27/06 | (2006.01) |
| B29L 31/30 | (2006.01) |

(52) U.S. Cl.
CPC .............. *C08L 27/06* (2013.01); *B29C 41/18* (2013.01); *B32B 27/065* (2013.01); *B32B 27/304* (2013.01); *B32B 27/40* (2013.01); *C08K 3/22* (2013.01); *C08K 5/0016* (2013.01); *C08K 5/12* (2013.01); *B29L 2031/3008* (2013.01); *B32B 2250/24* (2013.01); *C08K 2003/2248* (2013.01)

(58) Field of Classification Search
CPC ............................................ C08K 2003/2248
See application file for complete search history.

(56) References Cited

U.S. PATENT DOCUMENTS

| 2007/0100049 A1* | 5/2007 | Ishizuka ................ C08K 5/521 |
| | | 524/417 |
| 2010/0292379 A1* | 11/2010 | Fung .................... C08K 5/0008 |
| | | 524/296 |
| 2015/0322244 A1 | 11/2015 | Iwahori et al. |

FOREIGN PATENT DOCUMENTS

| CN | 104804332 A | 7/2015 |
| CN | 104812833 A | 7/2015 |
| CN | 105001547 A | 10/2015 |
| JP | S5622342 A | 3/1981 |
| JP | S58215440 A | 12/1983 |
| JP | H04281010 A | 10/1992 |
| JP | 2016089011 A | 5/2016 |
| RU | 20156001 A * | 6/2014 |
| WO | 2014091867 A1 | 6/2014 |
| WO | 2016098344 A1 | 6/2016 |
| WO | 2016152085 A1 | 9/2016 |

OTHER PUBLICATIONS

Jun. 12, 2018, International Search Report issued in the International Patent Application No. PCT/JP2018/009765.
Sep. 24, 2019, International Preliminary Reporton Patentability issued in the International Patent Application No. PCT/JP2018/009765.
Dec. 22, 2020, the Extended European Search Report issued by the European Patent Office in the corresponding European Patent Application No. 18771364.9.
Genova P et al., Influence of small-amount dispersive additives on the weatherability of PVC films, Angewandte Makromolekulare Chemie, 1990, pp. 197-206, vol. 176-177.
Aug. 10, 2021, Communication pursuant to Article 94(3) EPC issued by the European Patent Office in the corresponding European Patent Application No. 18771364.9.

* cited by examiner

*Primary Examiner* — Ana L. Woodward
(74) *Attorney, Agent, or Firm* — Kenja IP Law PC

(57) ABSTRACT

Provided is a vinyl chloride resin molded product that has a low peak top temperature of loss modulus E" after a heat aging test in the case of being lined with a foamed polyurethane molded product. A vinyl chloride resin composition comprises: (a) a vinyl chloride resin; (b) a plasticizer; and (c) a copper oxide.

9 Claims, No Drawings

VINYL CHLORIDE RESIN COMPOSITION, VINYL CHLORIDE RESIN MOLDED PRODUCT, AND LAMINATE

TECHNICAL FIELD

The present disclosure relates to a vinyl chloride resin composition, a vinyl chloride resin molded product, and a laminate.

BACKGROUND

Vinyl chloride resins typically have excellent characteristics such as cold resistance, heat resistance, and oil resistance, and therefore are used for various applications.

Specifically, for example in the formation of automobile interior parts such as automobile instrument panels, automobile interior materials such as a surface skin formed by a vinyl chloride resin molded product and a laminate formed of a surface skin formed by a vinyl chloride resin molded product lined with a foam such as a foamed polyurethane molded product are used.

A vinyl chloride resin molded product used as a surface skin is produced, for example, by molding a vinyl chloride resin composition containing a vinyl chloride resin and a plasticizer using a known molding method such as powder slush molding (for example, see PTL 1).

Specifically, for example, PTL 1 reports that a vinyl chloride resin molded product with excellent heat aging resistance can be produced using a vinyl chloride resin composition containing 100 parts to 200 parts by mass of a predetermined plasticizer with respect to 100 parts by mass of a vinyl chloride resin having a predetermined average degree of polymerization.

CITATION LIST

Patent Literature

PTL 1: WO 2014/091867 A1

SUMMARY

Technical Problem

A vinyl chloride resin molded product lined with a foam such as a foamed polyurethane molded product is required to have a low peak top temperature of loss modulus E" (i.e. contain a large amount of plastic deformation component and have excellent energy absorbability) even after a heat aging test.

With the vinyl chloride resin composition described in PTL 1, however, it is difficult to form a vinyl chloride resin molded product having a sufficiently low peak top temperature of loss modulus E" after a heat aging test, in the case of being stacked with a foamed polyurethane molded product.

It could therefore be helpful to provide a vinyl chloride resin molded product that has a low peak top temperature of loss modulus E" after a heat aging test in the case of being lined with a foamed polyurethane molded product. It could also be helpful to provide a vinyl chloride resin composition capable of forming the vinyl chloride resin molded product, and a laminate including the vinyl chloride resin molded product.

Solution to Problem

Through extensive studies to solve the problems stated above, the inventor discovered that, by using a vinyl chloride resin composition containing a vinyl chloride resin, a plasticizer, and a copper oxide, it is possible to form a vinyl chloride resin molded product that has a low peak top temperature of loss modulus E" after a heat aging test in the case of being lined with a foamed polyurethane molded product.

To advantageously solve the problems stated above, a vinyl chloride resin composition according to the present disclosure comprises: (a) a vinyl chloride resin; (b) a plasticizer; and (c) a copper oxide. By using the vinyl chloride resin composition containing (a) the vinyl chloride resin, (b) the plasticizer, and (c) the copper oxide, it is possible to form a vinyl chloride resin molded product that has a low peak top temperature of loss modulus E" after a heat aging test in the case of being lined with a foamed polyurethane molded product.

In the present disclosure, the expression that the vinyl chloride resin molded product is "lined with a foamed polyurethane molded product" covers all cases where the vinyl chloride resin molded product and the foamed polyurethane molded product are stacked adjacent to each other, including not only the case where the foamed polyurethane molded product that has already been foamed and cured is placed on the vinyl chloride resin molded product, but also the case where, on the vinyl chloride resin molded product, a raw material liquid of the foamed polyurethane molded product (typically, a mixed solution of two liquids, i.e. a liquid containing a polyol compound and a liquid containing a polyisocyanate compound) is foamed and cured to place the foamed polyurethane molded product on the vinyl chloride resin molded product.

Preferably, in the vinyl chloride resin composition according to the present disclosure, a content of (c) the copper oxide per 100 parts by mass of (a) the vinyl chloride resin is 0.01 parts by mass or more and 5 parts by mass or less. As a result of the content of (c) the copper oxide in the vinyl chloride resin composition being in the foregoing range, the tensile elongation of the vinyl chloride resin molded product obtained using the vinyl chloride resin composition can be enhanced, and the peak top temperature of loss modulus E" after a heat aging test can be further decreased in the case where the molded product is lined with a foamed polyurethane molded product.

Preferably, in the vinyl chloride resin composition according to the present disclosure, a content of (b) the plasticizer per 100 parts by mass of (a) the vinyl chloride resin is 30 parts by mass or more and 200 parts by mass or less. As a result of the content of (b) the plasticizer in the vinyl chloride composition being in the foregoing range, the tensile elongation of the vinyl chloride resin molded product obtained using the vinyl chloride resin composition can be enhanced, and the peak top temperature of loss modulus E" after a heat aging test can be further decreased in the case where the molded product is lined with a foamed polyurethane molded product. In addition, the plasticizer can be prevented from migrating to the surface of the vinyl chloride resin molded product and making the molded product surface sticky.

In the vinyl chloride resin composition according to the present disclosure, (b) the plasticizer contains at least one of trimellitate and pyromellitate. Even in the case of using trimellitate and/or pyromellitate as (b) the plasticizer, the vinyl chloride resin composition according to the present disclosure is capable of forming a vinyl chloride resin molded product that has a sufficiently low peak top temperature of loss modulus E" after a heat aging test in the case of being lined with a foamed polyurethane molded product.

Preferably, the vinyl chloride resin composition according to the present disclosure is used in powder molding. As a result of using the vinyl chloride resin composition in powder molding, for example, a vinyl chloride resin molded product that can be favorably used as a surface skin of an automobile instrument panel can be obtained easily.

Preferably, the vinyl chloride resin composition according to the present disclosure is used in powder slush molding. As a result of using the vinyl chloride resin composition in powder slush molding, for example, a vinyl chloride resin molded product that can be favorably used as a surface skin for an automobile instrument panel can be obtained more easily.

To advantageously solve the problems stated above, a vinyl chloride resin molded product according to the present disclosure is obtainable through molding of the above-described vinyl chloride resin composition. The vinyl chloride resin molded product obtained using the vinyl chloride resin composition has a low peak top temperature of loss modulus E" after a heat aging test in the case of being lined with a foamed polyurethane molded product.

The vinyl chloride resin molded product according to the present disclosure may be used as a surface skin of an automobile instrument panel.

To advantageously solve the problems stated above, a laminate according to the present disclosure comprises: a foamed polyurethane molded product; and the above-described vinyl chloride resin molded product. The laminate formed using the foamed polyurethane molded product and the vinyl chloride resin molded product has such a vinyl chloride resin molded product portion whose peak top temperature of loss modulus E" after a heat aging test is low.

Advantageous Effect

It is therefore possible to provide a vinyl chloride resin molded product that has a low peak top temperature of loss modulus E" after a heat aging test in the case of being lined with a foamed polyurethane molded product. It is also possible to provide a vinyl chloride resin composition capable of forming the vinyl chloride resin molded product, and a laminate including the vinyl chloride resin molded product.

DETAILED DESCRIPTION

One of the disclosed embodiments will be described in detail below.

A vinyl chloride resin composition according to the present disclosure can be used, for example, in the formation of a vinyl chloride resin molded product according to the present disclosure. The vinyl chloride resin molded product formed using the vinyl chloride resin composition according to the present disclosure can be used, for example, in the production of a laminate according to the present disclosure including the vinyl chloride resin molded product. The vinyl chloride resin molded product according to the present disclosure is suitable for use as an automobile interior material, e.g. a surface skin of an automobile instrument panel.

(Vinyl Chloride Resin Composition)

The vinyl chloride resin composition according to the present disclosure contains (a) a vinyl chloride resin, (b) a plasticizer, and (c) a copper oxide, and may optionally further contain other additives.

Since the vinyl chloride resin composition according to the present disclosure contains at least (a) the vinyl chloride resin, (b) the plasticizer, and (c) the copper oxide, with use of the vinyl chloride resin composition, it is possible to form a vinyl chloride resin molded product that has a low peak top temperature of loss modulus E" after a heat aging test in the case of being lined with a foamed polyurethane molded product.

The reason that the use of the vinyl chloride resin composition containing these components can decrease the peak top temperature of loss modulus E" after a heat aging test as compared with conventional vinyl chloride resin molded products is presumed as follows.

Typically, when a surface skin formed by a vinyl chloride resin molded product containing (b) the plasticizer is lined with a foamed polyurethane molded product, the plasticizer that is contained in the vinyl chloride resin molded product and can contribute to a lower peak top temperature of loss modulus E" of the molded product gradually migrates to the foamed polyurethane molded product side. The migration of the plasticizer is accelerated by heat aging. If the vinyl chloride resin molded product contains (c) the copper oxide, however, (c) the copper oxide in the vinyl chloride resin molded product comes into contact with the foamed polyurethane molded product, as a result of which the foamed polyurethane molded product changes in quality at the contact surface between the vinyl chloride resin molded product and the foamed polyurethane molded product, and a layer (shielding layer) that inhibits component migration is formed between the vinyl chloride resin molded product and the foamed polyurethane molded product. This shielding layer inhibits the migration of (b) the plasticizer from the vinyl chloride resin molded product to the foamed polyurethane molded product, so that a sufficiently low peak top temperature of loss modulus E" of the vinyl chloride resin molded product can be maintained even after a heat aging test.

<(a) Vinyl Chloride Resin>

(a) The vinyl chloride resin may, for example, contain one or more types of vinyl chloride resin particles, and optionally further contain one or more types of vinyl chloride resin fine particles. In particular, (a) the vinyl chloride resin preferably contains at least vinyl chloride resin particles, and more preferably contains vinyl chloride resin particles and vinyl chloride resin fine particles.

Conventionally known production methods such as suspension polymerization, emulsion polymerization, solution polymerization, and bulk polymerization can be used to produce (a) the vinyl chloride resin.

Herein, the term "resin particles" is used to refer to particles having a particle diameter of at least 30 μm and the term "resin fine particles" is used to refer to particles having a particle diameter of less than 30 μm.

Examples of (a) the vinyl chloride resin include homopolymers composed of vinyl chloride monomer units, and vinyl chloride-based copolymers preferably containing 50 mass % or more of vinyl chloride monomer units and more preferably containing 70 mass % or more of vinyl chloride monomer units. Specific examples of monomers (comonomers) copolymerizable with vinyl chloride monomers that can form vinyl chloride-based copolymers include those described in WO 2016/098344 A1. These components may be used alone or in combination of two or more thereof in a freely selected ratio.

<<Vinyl Chloride Resin Particles>>

In the vinyl chloride resin composition, the vinyl chloride resin particles typically function as a matrix resin (substrate). The vinyl chloride resin particles are preferably produced by suspension polymerization.

[Average Degree of Polymerization]

The average degree of polymerization of the vinyl chloride resin forming the vinyl chloride resin particles is preferably 800 or more, and is preferably 5000 or less, more preferably 3000 or less, and further preferably 2800 or less. As a result of the average degree of polymerization of the vinyl chloride resin forming the vinyl chloride resin particles being 800 or more, for example, favorable tensile elongation can be achieved while sufficiently ensuring the physical strength of the vinyl chloride resin molded product formed using the vinyl chloride resin composition. The vinyl chloride resin molded product that has a low peak top temperature of loss modulus E" after a heat aging test and favorable tensile elongation is suitable for use as, for example, an automobile interior material such as a surface skin of an automobile instrument panel that breaks as designed without fragments being scattered upon inflation and expansion of an air bag. As a result of the average degree of polymerization of the vinyl chloride resin forming the vinyl chloride resin particles being 5000 or less, the meltability of the vinyl chloride resin composition can be improved, and the surface smoothness of the vinyl chloride resin molded product formed using the composition can be improved.

Herein, the "average degree of polymerization" can be measured in accordance with JIS K6720-2.

[Average Particle Diameter]

The average particle diameter of the vinyl chloride resin particles is typically 30 µm or more, preferably 50 µm or more, and more preferably 100 or more, and preferably 500 µm or less, and more preferably 200 µm or less. As a result of the average particle diameter of the vinyl chloride resin particles being 30 µm or more, the powder fluidity of the vinyl chloride resin composition can be improved. As a result of the average particle diameter of the vinyl chloride resin particles being 500 µm or less, the meltability of the vinyl chloride resin composition can be enhanced, and the surface smoothness of the vinyl chloride resin molded product formed using the composition can be improved.

Herein, the "average particle diameter" can be measured as a volume-average particle diameter in accordance with JIS Z8825 by a laser diffraction method.

[Content Proportion]

The content proportion of the vinyl chloride resin particles in (a) the vinyl chloride resin is preferably 70 mass % or more, and more preferably 80 mass % or more, and may be 100 mass % or less, and is preferably 95 mass % or less, and more preferably 90 mass % or less. As a result of the content proportion of the vinyl chloride resin particles in (a) the vinyl chloride resin being 70 mass % or more, favorable tensile elongation can be achieved while sufficiently ensuring the physical strength of the vinyl chloride resin molded product formed using the vinyl chloride resin composition. As a result of the content proportion of the vinyl chloride resin particles in (a) the vinyl chloride resin being 95 mass % or less, the powder fluidity of the vinyl chloride resin composition can be improved.

<<Vinyl Chloride Resin Fine Particles>>

In the vinyl chloride resin composition, the vinyl chloride resin fine particles typically function as a dusting agent (powder fluidity modifier). The vinyl chloride resin fine particles are preferably produced by emulsion polymerization.

[Average Degree of Polymerization]

The average degree of polymerization of the vinyl chloride resin forming the vinyl chloride resin fine particles is preferably 500 or more and more preferably 700 or more, and is preferably 3000 or less and more preferably 2500 or less. As a result of the average degree of polymerization of the vinyl chloride resin forming the vinyl chloride resin fine particles as a dusting agent being 500 or more, the powder fluidity of the vinyl chloride resin composition can be improved, and the molded product formed using the composition has favorable tensile elongation. As a result of the average degree of polymerization of the vinyl chloride resin forming the vinyl chloride resin fine particles being 3000 or less, the meltability of the vinyl chloride resin composition can be enhanced, and the surface smoothness of the vinyl chloride resin molded product formed using the composition can be improved.

[Average Particle Diameter]

The average particle diameter of the vinyl chloride resin fine particles is typically less than 30 µm, preferably 10 µm or less, and more preferably 5 µm or less, and is preferably 0.1 µm or more, and more preferably 1 µm or more. As a result of the average particle diameter of the vinyl chloride resin fine particles being 0.1 µm or more, the powder fluidity of the vinyl chloride resin composition can be improved, for example, without excessively reducing the size as a dusting agent. As a result of the average particle diameter of the vinyl chloride resin fine particles being less than 30 µm, the meltability of the vinyl chloride resin composition can be enhanced, and the surface smoothness of the vinyl chloride resin molded product formed using the composition can be improved.

[Content Proportion]

The content proportion of the vinyl chloride resin fine particles in (a) the vinyl chloride resin is preferably 5 mass % or more and more preferably 10 mass % or more, and is preferably 30 mass % or less and more preferably 20 mass % or less. As a result of the content proportion of the vinyl chloride resin fine particles in (a) the vinyl chloride resin being 5 mass % or more, the powder fluidity of the vinyl chloride resin composition can be improved. As a result of the content proportion of the vinyl chloride resin fine particles in (a) the vinyl chloride resin being 30 mass % or less, the physical strength of the vinyl chloride resin molded product formed using the vinyl chloride resin composition can be enhanced.

<(b) Plasticizer>

(b) The plasticizer is a component that can impart flexibility and the like to the vinyl chloride resin molded product formed using the vinyl chloride resin composition.

<<Type>>

Specific examples of (b) the plasticizer include primary plasticizers and secondary plasticizers listed below.

Examples of so-called primary plasticizers include:

linear trimellitates having linear ester-forming alkyl groups, such as trimethyl trimellitate, triethyl trimellitate, tri-n-propyl trimellitate, tri-n-butyl trimellitate, tri-n-pentyl trimellitate, tri-n-hexyl trimellitate, tri-n-heptyl trimellitate, tri-n-octyl trimellitate, tri-n-nonyl trimellitate, tri-n-decyl trimellitate, tri-n-undecyl trimellitate, tri-n-dodecyl trimellitate, tri-n-tridecyl trimellitate, tri-n-tetradecyl trimellitate, tri-n-pentadecyl trimellitate, tri-n-hexadecyl trimellitate, tri-n-heptadecyl trimellitate, tri-n-stearyl trimellitate, and tri-n-alkyl trimellitate (the carbon numbers of alkyl groups included in tri-n-alkyl trimellitate may be different from each other in one molecule) [there trimellitates may each be a single compound or a mixture];

branched trimellitates having branched ester-forming alkyl groups, such as tri-i-propyl trimellitate, tri-i-butyl trimellitate, tri-i-pentyl trimellitate, tri-i-hexyl trimellitate, tri-i-heptyl trimellitate, tri-i-octyl trimellitate, tri(2-ethylhexyl) trimellitate, tri-i-nonyl trimellitate, tri-i-decyl trimellitate, tri-i-undecyl trimellitate, tri-i-dodecyl trimellitate, tri-i-tridecyl trimellitate, tri-i-tetradecyl trimellitate, tri-i-pentadecyl trimellitate, tri-i-hexadecyl trimellitate, tri-i-heptadecyl trimellitate, tri-i-octadecyl trimellitate, and trialkyl trimellitate (the carbon numbers of alkyl groups included in trialkyl trimellitate may be different from each other in one molecule) [there trimellitates may each be a single compound or a mixture];

linear pyromellitates having linear ester-forming alkyl groups, such as tetramethyl pyromellitate, tetraethyl pyromellitate, tetra-n-propyl pyromellitate, tetra-n-butyl pyromellitate, tetra-n-pentyl pyromellitate, tetra-n-hexyl pyromellitate, tetra-n-heptyl pyromellitate, tetra-n-octyl pyromellitate, tetra-n-nonyl pyromellitate, tetra-n-decyl pyromellitate, tetra-n-undecyl pyromellitate, tetra-n-dodecyl pyromellitate, tetra-n-tridecyl pyromellitate, tetra-n-tetradecyl pyromellitate, tetra-n-pentadecyl pyromellitate, tetra-n-hexadecyl pyromellitate, tetra-n-heptadecyl pyromellitate, tetra-n-stearyl pyromellitate, and tetra-n-alkyl pyromellitate (the carbon numbers of alkyl groups included in tetra-n-alkyl pyromellitate may be different from each other in one molecule) [there pyromellitates may each be a single compound or a mixture];

branched pyromellitates having branched ester-forming alkyl groups, such as tetra-i-propyl pyromellitate, tetra-i-butyl pyromellitate, tetra-i-pentyl pyromellitate, tetra-i-hexyl pyromellitate, tetra-i-heptyl pyromellitate, tetra-i-octyl pyromellitate, tetra(2-ethylhexyl) pyromellitate, tetra-i-nonyl pyromellitate, tetra-i-decyl pyromellitate, tetra-i-undecyl pyromellitate, tetra-i-dodecyl pyromellitate, tetra-i-tridecyl pyromellitate, tetra-i-tetradecyl pyromellitate, tetra-i-pentadecyl pyromellitate, tetra-i-hexadecyl pyromellitate, tetra-i-heptadecyl pyromellitate, tetra-i-octadecyl pyromellitate, and tetraalkyl pyromellitate (the carbon numbers of alkyl groups included in tetraalkyl pyromellitate may be different from each other in one molecule) [there pyromellitates may each be a single compound or a mixture];

phthalic acid derivatives such as dimethyl phthalate, diethyl phthalate, dibutyl phthalate, di(2-ethylhexyl) phthalate, di-n-octyl phthalate, diisobutyl phthalate, diheptyl phthalate, diphenyl phthalate, diisodecyl phthalate, ditridecyl phthalate, diundecyl phthalate, dibenzyl phthalate, butyl benzyl phthalate, dinonyl phthalate, and dicyclohexyl phthalate;

isophthalic acid derivatives such as dimethyl isophthalate, di(2-ethylhexyl) isophthalate, and diisooctyl isophthalate;

tetrahydrophthalic acid derivatives such as di(2-ethylhexyl) tetrahydrophthalate, di-n-octyl tetrahydrophthalate, and diisodecyl tetrahydrophthalate;

adipic acid derivatives such as di-n-butyl adipate, di(2-ethylhexyl) adipate, diisodecyl adipate, and diisononyl adipate;

azelaic acid derivatives such as di(2-ethylhexyl) azelate, diisooctyl azelate, and di-n-hexyl azelate;

sebacic acid derivatives such as di-n-butyl sebacate, di(2-ethylhexyl) sebacate, diisodecyl sebacate, and di(2-butyloctyl) sebacate;

maleic acid derivatives such as di-n-butyl maleate, dimethyl maleate, diethyl maleate, and di(2-ethylhexyl) maleate;

fumaric acid derivatives such as di-n-butyl fumarate and di(2-ethylhexyl) fumarate;

citric acid derivatives such as triethyl citrate, tri-n-butyl citrate, acetyl triethyl citrate, and acetyl tri(2-ethylhexyl) citrate;

itaconic acid derivatives such as monomethyl itaconate, monobutyl itaconate, dimethyl itaconate, diethyl itaconate, dibutyl itaconate, and di(2-ethylhexyl) itaconate;

oleic acid derivatives such as butyl oleate, glyceryl monooleate, and diethylene glycol monooleate;

ricinoleic acid derivatives such as methyl acetyl ricinoleate, butyl acetyl ricinoleate, glyceryl monoricinoleate, and diethylene glycol monoricinoleate;

stearic acid derivatives such as n-butyl stearate and diethylene glycol distearate (except 12-hydroxystearic acid ester);

other fatty acid derivatives such as diethylene glycol monolaurate, diethylene glycol dipelargonate, and pentaerythritol fatty acid esters;

phosphoric acid derivatives such as triethyl phosphate, tributyl phosphate, tri(2-ethylhexyl) phosphate, tributoxyethyl phosphate, triphenyl phosphate, cresyl diphenyl phosphate, tricresyl phosphate, trixylenyl phosphate, and tris (chloroethyl) phosphate;

glycol derivatives such as diethylene glycol dibenzoate, dipropylene glycol dibenzoate, triethylene glycol dibenzoate, triethylene glycol di(2-ethylbutyrate), triethylene glycol di(2-ethylhexanoate), and dibutyl methylenebisthioglycolate;

glycerin derivatives such as glycerol monoacetate, glycerol triacetate, and glycerol tributyrate;

epoxy derivatives such as epoxy hexahydro diisodecyl phthalate, epoxy triglyceride, epoxidized octyl oleate, and epoxidized decyl oleate; and polyester plasticizers such as adipic acid polyesters, sebacic acid polyesters, and phthalic acid polyesters.

Examples of so-called secondary plasticizers include epoxidized vegetable oils such as epoxidized soybean oil and epoxidized linseed oil; chlorinated paraffin; fatty acid esters of glycol such as triethylene glycol dicaprylate; butyl epoxy stearate; phenyl oleate; and methyl dihydroabietate.

These plasticizers may be used alone or in combination of two or more thereof in a freely selected ratio.

Of these plasticizers, in terms of easily and favorably obtaining the vinyl chloride resin composition and the vinyl chloride resin molded product, it is preferable to use at least a primary plasticizer and more preferable to use a primary plasticizer and a secondary plasticizer together as (b) the plasticizer. Specifically, it is preferable to use trimellitate and/or pyromellitate and further preferable to use trimellitate and epoxidized soybean oil together as (b) the plasticizer.

<<Content>>

The content of (b) the plasticizer per 100 parts by mass of (a) the vinyl chloride resin is preferably 30 parts by mass or more, more preferably 60 parts by mass or more, and further preferably 80 parts by mass or more, and is preferably 200 parts by mass or less, more preferably 160 parts by mass or less, and further preferably 140 parts by mass or less. As a result of the content of (b) the plasticizer being 30 parts by mass or more, the tensile elongation of the vinyl chloride resin molded product formed using the vinyl chloride resin composition can be enhanced, and the peak top temperature of loss modulus E" after a heat aging test can be further decreased. As a result of the content of (b) the plasticizer being 200 parts by mass or less, the plasticizer can be prevented from migrating to the surface of the vinyl chloride resin molded product and making the molded product surface sticky.

<(c) Copper Oxide>

(c) The copper oxide is a component that can decrease the peak top temperature of loss modulus E" after a heat aging test of the vinyl chloride resin molded product formed using the vinyl chloride resin composition.

<<Type>>

Examples of (c) the copper oxide include cupric oxide (CuO) and cuprous oxide ($Cu_2O$), without being limited thereto. These copper oxides may be used alone or in combination of two or more thereof in a freely selected ratio. In particular, in terms of further decreasing the peak top temperature of loss modulus E" after a heat aging test of the vinyl chloride resin molded product, cuprous oxide is preferable.

<<Average Particle Diameter>>

The average particle diameter of (c) the copper oxide in median diameter (D50) is preferably 0.1 μm or more, more preferably 1 μm or more, and further preferably 2 μm or more, and is preferably 15 μm or less, more preferably 10 μm or less, and further preferably 7 μm or less. As a result of the average particle diameter of (c) the copper oxide being 0.1 μm or more, the handleability of (c) the copper oxide and the powder fluidity of the vinyl chloride resin composition can be improved. As a result of the average particle diameter of (c) the copper oxide being 15 μm or less, the peak top temperature of loss modulus E" after a heat aging test of the vinyl chloride resin molded product can be further decreased, presumably because the above-described shielding layer is formed efficiently.

Herein, the "median diameter" can be measured using a particle size analyzer (produced by Shimadzu Corporation, product name "SALD-2300") by a laser diffraction scattering method.

<<Content>>

The content of (c) the copper oxide per 100 parts by mass of (a) the vinyl chloride resin is preferably 0.01 parts by mass or more, more preferably 0.02 parts by mass or more, further preferably 0.03 parts by mass or more, and particularly preferably 0.05 parts by mass or more, and is preferably 5 parts by mass or less, more preferably 3 parts by mass or less, further preferably 2 parts by mass or less, even more preferably 1.2 parts by mass or less, and particularly preferably 0.6 parts by mass or less. As a result of the content of (c) the copper oxide being 0.01 parts by mass or more, the peak top temperature of loss modulus E" after a heat aging test of the vinyl chloride resin molded product formed using the vinyl chloride resin composition can be further decreased. As a result of the content of (c) the copper oxide being 5 parts by mass or less, the peak top temperature of loss modulus E" after a heat aging test can be decreased sufficiently while ensuring favorable tensile elongation of the vinyl chloride resin molded product (particularly, tensile elongation after being left in a harsh environment such as an environment at a temperature of 130° C. for 600 hours). As a result of the content of (c) the copper oxide being 3 parts by mass or less, appearance degradation of the vinyl chloride resin molded product after a heat aging test can be suppressed.

<Additives>

The vinyl chloride resin composition according to the present disclosure may further contain various additives, besides the components described above. Although no specific limitations are placed on these additives, examples of additives that may be used include: stabilizers such as perchloric acid-treated hydrotalcite, zeolites, β-diketones, and fatty acid metal salts; mold release agents; dusting agents other than the vinyl chloride resin fine particles; impact modifiers; perchloric acid compounds other than perchloric acid-treated hydrotalcite (for example, sodium perchlorate and potassium perchlorate); antioxidants; fungicides; flame retardants; antistatic agents; fillers; light stabilizers; foaming agents; moldability modifiers (silicone oil, etc.); and colorants.

For example, those described in WO 2016/098344 A1 may be used as such additives, without being limited thereto.

<Production Method of Vinyl Chloride Resin Composition>

The vinyl chloride resin composition according to the present disclosure can be produced by mixing the components described above.

No specific limitations are placed on the method used to mix (a) the vinyl chloride resin, (b) the plasticizer, (c) the copper oxide, and additives used as required. One example of the mixing method involves mixing the components with the exception of the dusting agent including the vinyl chloride resin fine particles by dry blending and subsequently adding and mixing in the dusting agent. The dry blending is preferably carried out using a Henschel mixer. The temperature during dry blending is not limited, and is preferably 50° C. or more and more preferably 70° C. or more, and preferably 200° C. or less.

<Use of Vinyl Chloride Resin Composition>

The obtained vinyl chloride resin composition can be suitably used in powder molding, and more suitably used in powder slush molding.

(Vinyl Chloride Resin Molded Product)

The vinyl chloride resin molded product according to the present disclosure is obtained through molding of the above-described vinyl chloride resin composition by any method. Since the vinyl chloride resin molded product according to the present disclosure is formed using the above-described vinyl chloride resin composition and contains at least (a) the vinyl chloride resin, (b) the plasticizer, and (c) the copper oxide, its peak top temperature of loss modulus E" after a heat aging test is sufficiently low even in the case of being lined with a foamed polyurethane molded product. Hence, the vinyl chloride resin molded product according to the present disclosure is suitable for use as an automobile interior material, and particularly as a surface skin of an automobile instrument panel.

<<Method of Forming Vinyl Chloride Resin Molded Product>>

In the case of forming the vinyl chloride resin molded product by powder slush molding, the mold temperature during powder slush molding is not limited, and is preferably 200° C. or more and more preferably 220° C. or more, and preferably 300° C. or less and more preferably 280° C. or less.

In the production of the vinyl chloride resin molded product, for example, the following method may be used without being limited thereto: The vinyl chloride resin composition according to the present disclosure is sprinkled onto a mold having a temperature in the aforementioned range. The vinyl chloride resin composition is initially left for 5 seconds or more and 30 seconds or less and, after shaking off any excess vinyl chloride resin composition, is then further left for 30 seconds or more and 3 minutes or less at a given temperature. The mold is subsequently cooled to 10° C. or more and 60° C. or less, and the obtained vinyl chloride resin molded product according to the present disclosure is removed from the mold. A sheet-like molded product having the shape of the mold is thus yielded.

(Laminate)

The laminate according to the present disclosure comprises a foamed polyurethane molded product and the above-described vinyl chloride resin molded product. The vinyl chloride resin molded product typically forms one surface of the laminate.

Since the laminate according to the present disclosure, for example, is formed using the vinyl chloride resin composition according to the present disclosure and includes the vinyl chloride resin molded product that has a low peak top temperature of loss modulus E" after a heat aging test, the laminate is suitable for use as an automobile interior material of an automobile instrument panel, etc.

The method of stacking the foamed polyurethane molded product and the vinyl chloride resin molded product is not limited. Examples of stacking methods that can be adopted include: (1) a method in which the foamed polyurethane molded product and the vinyl chloride resin molded product are prepared separately and are subsequently joined together by, for example, thermal fusion bonding, thermal adhesion, or using a commonly known adhesive; and (2) a method in which raw materials of the foamed polyurethane molded product such as an isocyanate and a polyol are caused to react on the vinyl chloride resin molded product so as to polymerize while carrying out polyurethane foaming by a commonly known method to directly form the foamed polyurethane molded product on the vinyl chloride resin molded product. The latter method (2) is more suitable because it involves a simple process and enables laminates of various different shapes to be obtained while facilitating firm adhesion of the vinyl chloride resin molded product and the foamed polyurethane molded product.

EXAMPLES

The following provides a more specific description of the present disclosure based on examples. However, the present disclosure is not limited to the following examples. In the following description, "%" and "parts" used in expressing quantities are by mass, unless otherwise specified.

The following methods were used to evaluate the peak top temperature of loss modulus E" of the vinyl chloride resin molded product after heating (heat aging test), the tensile elongation (normal temperature and low temperature) of the vinyl chloride resin molded product in an initial stage and after heating (heat aging test), and the gloss change and surface cracking of the vinyl chloride resin molded product as a result of heating (heat aging test).

<Peak Top Temperature of Loss Modulus E" after Heating Test>

A laminate lined with a foamed polyurethane molded product was used as a sample. The sample was placed in an oven, and heated for 600 hours at a temperature of 130° C. Thereafter, the foamed polyurethane molded product was peeled from the heated sample, to obtain a vinyl chloride resin molded sheet alone.

The obtained vinyl chloride resin molded sheet was punched to dimensions of width 10 mm×length 40 mm, to yield a measurement sample. Then, the peak top temperature (° C.) of loss modulus E" of the measurement sample was measured in accordance with JIS K7244-4 at a frequency of 10 Hz, a heating rate of 2° C./minute, and a measurement temperature range of −90° C. to +100° C. Lower peak top temperature of loss modulus E" indicates better viscosity at low temperature of the vinyl chloride resin molded product after heating (heat aging test).

<Tensile Elongation>

The tensile elongation of the vinyl chloride resin molded product was evaluated by measuring the tensile breaking elongation in an initial stage (before heating) and after heating (heat aging test) at each of normal temperature (23° C.) and low temperature (−20° C.) in the following manner.

<<Tensile Elongation at Normal Temperature>>

[Initial Stage]

The obtained vinyl chloride resin molded sheet was punched with a No. 1 dumbbell prescribed by JIS K6251, and the tensile breaking elongation (%) at a normal temperature of 23° C. was measured in accordance with JIS K7113 at a tension rate of 200 mm/minute. Higher tensile breaking elongation indicates better tensile elongation of the vinyl chloride resin molded product in an initial stage (before heating).

[After Heating (Heat Aging Test)]

A laminate lined with a foamed polyurethane molded product was used as a sample. The sample was placed in an oven, and heated for 250 hours or 600 hours at a temperature of 130° C. Thereafter, the foamed polyurethane molded product was peeled from the heated sample, to obtain a vinyl chloride resin molded sheet alone. The tensile breaking elongation (%) of the vinyl chloride resin molded sheet after 250 hours or 600 hours of heating was then measured under the same conditions as in the initial stage. Higher tensile breaking elongation indicates better tensile elongation of the vinyl chloride resin molded product after heating (heat aging test).

<<Tensile Elongation at Low Temperature>>

[Initial Stage]

The obtained vinyl chloride resin molded sheet was punched with a No. 1 dumbbell prescribed by JIS K6251, and the tensile breaking elongation (%) at a low temperature of −20° C. was measured in accordance with JIS K7113 at a tension rate of 200 mm/minute. Higher tensile breaking elongation indicates better tensile elongation at low temperature of the vinyl chloride resin molded product in an initial stage (before heating).

[After Heating (Heat Aging Test)]

A laminate lined with a foamed polyurethane molded product was used as a sample. The sample was placed in an oven, and heated for 250 hours or 600 hours at a temperature of 130° C. Thereafter, the foamed polyurethane molded product was peeled from the heated sample, to obtain a vinyl chloride resin molded sheet alone. The tensile breaking elongation (%) of the vinyl chloride resin molded sheet after 250 hours or 600 hours of heating was then measured under the same conditions as in the initial stage. Higher tensile breaking elongation indicates better tensile elongation of the vinyl chloride resin molded product after heating (heat aging test).

<Gloss Change>

A laminate lined with a foamed polyurethane molded product was cut to a size of 7 cm×14 cm, as a test piece.

Using a sunshine weatherometer (produced by Suga Test Instruments Co., Ltd., product name "S80"), the test piece was left for 200 hours at a black panel temperature of 83° C., and the glossiness change (Δgloss) of the surface skin between before and after being left was calculated.

Specifically, the glossiness change (Δgloss) of the surface skin was calculated as follows: The glossiness (angle of incidence: 60°) on the surface skin side of the test piece was measured using a gloss meter (produced by Tokyo Denshoku Co., Ltd., product name "gloss meter GP-60"), and Δgloss which is the difference between the glossiness before being left and the glossiness after being left (glossiness after being left—glossiness before being left) was calculated. Δgloss closer to 0 indicates better glossiness stability.

<Surface Cracking>

A laminate lined with a foamed polyurethane molded product was used as a sample. The sample was placed in an oven, and heated for 600 hours at a temperature of 150° C. The surface of the laminate on the vinyl chloride resin molded product side after the heating was observed using an optical microscope (magnification: ×60), and evaluated based on the following criteria. Less surface cracking after the heating indicates less appearance degradation of the vinyl chloride resin molded product.

A: No cracks observed at the surface.
B: Cracks observed at part of the surface.
C: Cracks observed at the whole surface.

Example 1

<Production of Vinyl Chloride Resin Composition>

Ingredients shown in Table 1 with the exception of plasticizers (trimellitate, pyromellitate, and epoxidized soybean oil) and vinyl chloride resin fine particles used as a dusting agent were added into a Henschel mixer and mixed. The plasticizers were all added to the mixture after increasing the temperature of the mixture to 80° C., and the mixture was further heated to be dried up (i.e., the mixture changed to a dry state through absorption of the plasticizers by vinyl chloride resin particles used as vinyl chloride resin). Thereafter, once the dried-up mixture had been cooled to a temperature of 70° C. or lower, the vinyl chloride resin fine particles used as the dusting agent were added to the mixture to yield a vinyl chloride resin composition.

<Formation of Vinyl Chloride Resin Molded Product>

The resultant vinyl chloride resin composition was sprinkled onto a textured mold that was heated to a temperature of 250° C. and, after being left to melt for a given time of about 8 seconds to 20 seconds, excess vinyl chloride resin composition was shaken off. Next, the textured mold sprinkled with the vinyl chloride resin composition was placed in an oven set to a temperature of 200° C. and, once 60 seconds had passed from the placement, was cooled with cooling water. Once the mold had cooled to 40° C., a vinyl chloride resin molded sheet of 145 mm×175 mm×1 mm was removed from the mold as a vinyl chloride resin molded product.

The tensile elongation (initial stage) of the resultant vinyl chloride resin molded sheet at each of normal temperature and low temperature was evaluated by the foregoing methods. The results are shown in Table 1.

<Formation of Laminate>

The obtained vinyl chloride resin molded sheet was placed in a mold of 200 mm×300 mm×10 mm with the textured surface underneath.

Separately, a polyol mixture was obtained by mixing 50 parts of a propylene glycol PO (propylene oxide)/EO (ethylene oxide) block adduct (hydroxyl value 28, terminal EO unit content 10%, internal EO unit content 4%), 50 parts of a glycerin PO/EO block adduct (hydroxyl value 21, terminal EO unit content 14%), 2.5 parts of water, 0.2 parts of an ethylene glycol solution of triethylenediamine (product name: TEDA-L33 produced by Tosoh Corporation), 1.2 parts of triethanolamine, 0.5 parts of triethylamine, and 0.5 parts of a foam stabilizer (product name: F-122 produced by Shin-Etsu Chemical Co., Ltd.). The obtained polyol mixture was mixed with polymethylene polyphenylene polyisocyanate (polymeric MDI) in a ratio determined to give an isocyanate index of 98, to prepare a mixed solution. The prepared mixed solution was poured onto the vinyl chloride resin molded sheet that had been placed in the mold as described above. Thereafter, the mold was covered with a 348 mm×255 mm×10 mm aluminum plate to seal the mold. After the mold had been sealed for 5 minutes, a laminate formed by the vinyl chloride resin molded sheet (thickness: 1 mm) as a surface skin lined with a foamed polyurethane molded product (thickness: 9 mm, density: 0.18 g/cm$^3$) was formed in the mold.

The formed laminate was then removed from the mold. For the vinyl chloride resin sheet in the laminate, the peak top temperature of loss modulus E" after heating (heat aging test), the tensile elongation (after heating (heat aging test)) at each of normal temperature and low temperature, and the gloss change and surface cracking as a result of heating (heat aging test) were evaluated by the foregoing methods. The results are shown in Table 1.

Examples 2 to 6

A vinyl chloride resin composition, a vinyl chloride resin molded sheet, and a laminate were produced in the same way as in Example 1 with the exception that, in the preparation of the vinyl chloride resin composition, the amount of cuprous oxide was changed as shown in Table 1.

The evaluations were performed by the same methods as in Example 1. The results are shown in Table 1.

Examples 7 to 9

A vinyl chloride resin composition, a vinyl chloride resin molded sheet, and a laminate were produced in the same way as in Example 1 with the exception that, in the preparation of the vinyl chloride resin composition, cupric oxide was used in the amount shown in Table 1 instead of cuprous oxide.

The evaluations were performed by the same methods as in Example 1. The results are shown in Table 1.

Comparative Example 1

A vinyl chloride resin composition, a vinyl chloride resin molded sheet, and a laminate were produced in the same way as in Example 1 with the exception that, in the preparation of the vinyl chloride resin composition, cupric oxide was not used.

The evaluations were performed by the same methods as in Example 1. The results are shown in Table 1.

| | | | Ex. 1 | Ex. 2 | Ex. 3 | Ex. 4 | Ex. 5 | Ex. 6 | Ex. 7 | Ex. 8 | Ex. 9 | Comp. Ex. 1 |
|---|---|---|---|---|---|---|---|---|---|---|---|---|
| Vinyl chloride resin composition | Substrate | Vinyl chloride resin particles[1] [parts by mass] | 100 | 100 | 100 | 100 | 100 | 100 | 100 | 100 | 100 | 100 |
| | Dusting agent | Vinyl chloride resin fine particles[2] [parts by mass] | 11 | 11 | 11 | 11 | 11 | 11 | 11 | 11 | 11 | 11 |
| | | Vinyl chloride resin fine particles[3] [parts by mass] | 11 | 11 | 11 | 11 | 11 | 11 | 11 | 11 | 11 | 11 |

-continued

|  |  | Ex. 1 | Ex. 2 | Ex. 3 | Ex. 4 | Ex. 5 | Ex. 6 | Ex. 7 | Ex. 8 | Ex. 9 | Comp. Ex. 1 |
|---|---|---|---|---|---|---|---|---|---|---|---|
| Plasticizer | Trimellitate[4] [parts by mass] | 80 | 80 | 80 | 80 | 80 | 80 | 80 | 80 | 80 | 80 |
|  | Pyromellitate[5] [parts by mass] | 80 | 80 | 80 | 80 | 80 | 80 | 80 | 80 | 80 | 80 |
|  | Epoxidized soybean oil[6] [parts by mass] | 5 | 5 | 5 | 5 | 5 | 5 | 5 | 5 | 5 | 5 |
| Copper oxide | Cuprous oxide[7] [parts by mass] | 0.1 | 0.3 | 0.5 | 1 | 2 | 5 | — | — | — | — |
|  | Cupric oxide[8] [parts by mass] | — | — | — | — | — | — | 0.1 | 0.5 | 5 | — |
| Stabilizer | Perchloric acid-partially introduced hydrotalcite[9] [parts by mass] | 4.5 | 4.5 | 4.5 | 4.5 | 4.5 | 4.5 | 4.5 | 4.5 | 4.5 | 4.5 |
|  | Zeolite[10] [parts by mass] | 2.4 | 2.4 | 2.4 | 2.4 | 2.4 | 2.4 | 2.4 | 2.4 | 2.4 | 2.4 |
|  | β-diketone[11] [parts by mass] | 0.5 | 0.5 | 0.5 | 0.5 | 0.5 | 0.5 | 0.5 | 0.5 | 0.5 | 0.5 |
|  | Phosphite[12] [parts by mass] | 0.6 | 0.6 | 0.6 | 0.6 | 0.6 | 0.6 | 0.6 | 0.6 | 0.6 | 0.6 |
|  | Hindered amine light stabilizer[13] [parts by mass] | 0.2 | 0.2 | 0.2 | 0.2 | 0.2 | 0.2 | 0.2 | 0.2 | 0.2 | 0.2 |
|  | Zinc stearate[14] [parts by mass] | 0.2 | 0.2 | 0.2 | 0.2 | 0.2 | 0.2 | 0.2 | 0.2 | 0.2 | 0.2 |
| Mold release agent | 12-hydroxystearic acid[15] [parts by mass] | 0.4 | 0.4 | 0.4 | 0.4 | 0.4 | 0.4 | 0.4 | 0.4 | 0.4 | 0.4 |
| Moldability modifier | Silicone oil[16] [parts by mass] | 0.5 | 0.5 | 0.5 | 0.5 | 0.5 | 0.5 | 0.5 | 0.5 | 0.5 | 0.5 |
| Colorant | Carbon black pigment[17] [parts by mass] | 3.8 | 3.8 | 3.8 | 3.8 | 3.8 | 3.8 | 3.8 | 3.8 | 3.8 | 3.8 |
| Evaluation category | Peak top temperature of loss modulus after heat aging test [° C.] | −25 | −25 | −25 | −26 | −27 | −24 | −24 | −24 | −23 | −22 |
| Tensile elongation (23° C.) [%] | Initial | 410 | 430 | 420 | 420 | 440 | 430 | 400 | 420 | 420 | 410 |
|  | 250 hours | 330 | 340 | 330 | 320 | 350 | 330 | 360 | 350 | 320 | 350 |
|  | 600 hours | 260 | 240 | 240 | 250 | 220 | 180 | 250 | 250 | 180 | 170 |
| Tensile elongation (−20° C.) [%] | Initial | 280 | 290 | 300 | 290 | 300 | 290 | 280 | 290 | 290 | 280 |
|  | 250 hours | 200 | 180 | 190 | 180 | 210 | 190 | 190 | 200 | 180 | 200 |
|  | 600 hours | 110 | 100 | 110 | 100 | 100 | 70 | 110 | 110 | 60 | 90 |
| Δgloss [-] | 250 hours | 0.7 | 0.8 | 0.9 | 0.9 | 1.2 | 1.6 | 0.7 | 0.8 | 1.2 | 0.7 |
|  | 600 hours | 1.0 | 1.7 | 2.0 | 2.1 | 3.4 | 1.4 | 1.0 | 2.0 | 2.8 | 0.6 |
|  | Surface cracking [-] | A | A | A | A | B | C | A | A | C | A |

1) product name "TH-2800" produced by Taiyo Vinyl Corporation (suspension polymerization, average degree of polymerization: 2800, average particle diameter: 145 μm)

2) product name "ZEST PQLTX" produced by Shin Dai-ichi Vinyl Corporation (emulsion polymerization, average degree of polymerization: 800, average particle diameter: 1.8 μm)

3) product name "Ryuron Paste® 761" (Ryuron paste is a registered trademark in Japan, other countries, or both) produced by Tosoh Corporation (emulsion polymerization, average degree of polymerization: 2100, average particle diameter: 1.7 μm)

4) product name "TRIMEX N-08" produced by Kao Corporation 5) product name "ADK CIZER UL-80" produced by ADEKA Corporation 6) product name "ADK CIZER 0-130S" produced by ADEKA Corporation 7) product name "cuprous oxide R" produced by Furukawa Chemicals Co., Ltd., (average particle diameter: 4.2 μm)

8) product name "cupric oxide FCO-500" produced by Furukawa Chemicals Co., Ltd., (average particle diameter: 3.9 μm)

9) product name "ALCAMIZER 5" produced by Kyowa Chemical Industry Co., Ltd.

10) product name "MIZUKALIZER DS" produced by Mizusawa Industrial Chemicals, Ltd.

11) product name "Karenz DK-1" produced by Showa Denko K.K.

12) product name "ADK STAB 522A" produced by ADEKA Corporation 13) product name "ADK STAB LA-72" produced by ADEKA Corporation 14) product name "SAKAI SZ2000" produced by Sakai Chemical Industry Co., Ltd.

15) product name "ADK STAB LS-12" produced by ADEKA Corporation 16) product name "KF-9701" produced by Shin-Etsu Silicone (silanol both-end-modified silicone oil)

17) product name "DA PX 1720(A) Black" produced by Dainichiseika Color and Chemicals Mfg. Co., Ltd.

It can be understood from Table 1 that, in Examples 1 to 9 using a vinyl chloride resin composition containing (a) the vinyl chloride resin, (b) the plasticizer, and (c) the copper oxide, the peak top temperature of loss modulus E" after a heat aging test of the vinyl chloride resin molded product was lower than in Comparative Example 1 using a vinyl chloride resin composition containing (a) the vinyl chloride resin and (b) the plasticizer but not containing (c) the copper oxide, in the case of stacking the vinyl chloride resin molded product and a foamed polyurethane molded product.

INDUSTRIAL APPLICABILITY

It is therefore possible to provide a vinyl chloride resin molded product that has a low peak top temperature of loss modulus E" after a heat aging test in the case of being lined with a foamed polyurethane molded product. It is also possible to provide a vinyl chloride resin composition capable of forming the vinyl chloride resin molded product, and a laminate including the vinyl chloride resin molded product.

The invention claimed is:

1. A vinyl chloride resin composition comprising:
(a) a vinyl chloride resin;
(b) a plasticizer; and
(c) a copper oxide, wherein the content of (c) the copper oxide per 100 parts by mass of (a) the vinyl chloride resin is 0.01 parts by mass or more and 5 parts by mass or less, the content of (b) the plasticizer per 100 parts by mass of (a) the vinyl chloride resin is 80 parts by mass or more and 200 parts by mass or less, and (a) the vinyl chloride resin contains vinyl chloride resin particles having a particle diameter of at least 30 μm and vinyl chloride resin fine particles having a particle diameter of less than 30 μm.

2. The vinyl chloride resin composition according to claim 1, wherein (b) the plasticizer contains at least one of trimellitate and pyromellitate.

3. The vinyl chloride resin composition according to claim 1 used in powder molding.

4. The vinyl chloride resin composition according to claim 1 used in powder slush molding.

5. A vinyl chloride resin molded product obtainable through molding of the vinyl chloride resin composition according to claim 1.

6. The vinyl chloride resin molded product according to claim 5 used as a surface skin of an automobile instrument panel.

7. A laminate comprising:
a foamed polyurethane molded product; and
the vinyl chloride resin molded product according to claim 5.

8. The vinyl chloride resin composition according to claim 1, wherein the content of (c) the copper oxide per 100 parts by mass of (a) the vinyl chloride resin is 0.01 parts by mass or more and 0.6 parts by mass or less.

9. The vinyl chloride resin composition according to claim 1, wherein (b) the plasticizer contains pyromellitate.

* * * * *